United States Patent
Droste et al.

(10) Patent No.: US 12,192,907 B2
(45) Date of Patent: Jan. 7, 2025

(54) SYSTEM AND METHOD FOR ENABLING FIFTH GENERATION MOBILE INITIATED COMMUNICATIONS ONLY MODE FOR EXTENDED VEHICLE NOTIFICATIONS

(71) Applicant: GM GLOBAL TECHNOLOGY OPERATIONS LLC, Detroit, MI (US)

(72) Inventors: Scott T. Droste, West Bloomfield, MI (US); Reza Amini, Bloomfield, MI (US); Yu-Kung Ke, Shelby Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 372 days.

(21) Appl. No.: 17/871,355

(22) Filed: Jul. 22, 2022

(65) Prior Publication Data

US 2024/0031936 A1      Jan. 25, 2024

(51) Int. Cl.
*H04W 52/00*       (2009.01)
*H04W 52/02*       (2009.01)

(52) U.S. Cl.
CPC ... *H04W 52/0277* (2013.01); *H04W 52/0264* (2013.01); *H04W 52/028* (2013.01)

(58) Field of Classification Search
None
See application file for complete search history.

(56) References Cited

U.S. PATENT DOCUMENTS

2016/0252944 A1* 9/2016 Kim .................. H04W 52/0264
                                                                 713/340

* cited by examiner

*Primary Examiner* — Suhail Khan
(74) *Attorney, Agent, or Firm* — Quinn IP Law

(57) ABSTRACT

A system for 5G MICO mode operation of a vehicle during an ignition off mode includes a telematics unit and a telematics communication mode controller. The controller monitors energy consumption by the telematics unit and estimates a total energy consumption of the telematics unit through a time period. The controller further compares the total energy consumption to a first threshold energy consumption and a second threshold energy consumption and, when the total energy consumption is less than the first threshold energy consumption, operates the telematics unit in a first mode including unrestricted communication. The telematics communication mode controller, when the total energy consumption is between the first threshold energy consumption and the second threshold energy consumption, operates the telematics unit in a second MICO mode and, when the total energy consumption is greater than the second threshold energy consumption, deactivates communications by the telematics unit.

19 Claims, 5 Drawing Sheets

SYSTEM AND METHOD FOR ENABLING FIFTH GENERATION MOBILE INITIATED COMMUNICATIONS ONLY MODE FOR EXTENDED VEHICLE NOTIFICATIONS

INTRODUCTION

The disclosure generally relates to a system and method for enabling fifth generation (5G) mobile initiated communications only (MICO) mode for extended vehicle operations.

A vehicle including an internal combustion engine includes an alternator which provides electrical energy within a design or desired voltage range for vehicle functions including charging a battery while the vehicle is operational or in an ignition on state. An electric vehicle includes a battery state of charge that is closely managed while the vehicle is operational.

In a non-operational state or an ignition off state, a vehicle includes a battery with an initial state of charge. While the vehicle remains in the ignition off state and the battery is not being charged by an external power source, a number of vehicle systems continue to draw electrical energy from the battery and drain the battery, resulting in a decreasing battery state of charge over time. Further, batteries in an open circuit condition slowly lose state of charge over time.

Vehicles utilize wireless communication to accomplish a variety of functions. Some functions are performed when the vehicle is operational. Some functions are performed when the vehicle is non-operational or in the ignition off state.

SUMMARY

A system for enabling fifth generation (5G) mobile initiated communications only (MICO) mode for extended operation of a vehicle is provided. The system includes an energy storage device, a wireless communication system, and a telematics unit configured for communicating with a remote server device through the wireless communication system and drawing electrical energy from the energy storage device. The system further includes a telematics communication mode controller, including programming to monitor initiation of an ignition off mode of the vehicle, monitor energy consumption by the telematics unit over a time period starting with the initiation of the ignition off mode, and estimate a total energy consumption of the telematics unit through the time period. The telematics communication mode controller further includes programming to compare the total energy consumption of the telematics unit through the time period to a first threshold energy consumption and a second threshold energy consumption and, when the total energy consumption of the telematics unit through the time period is less than the first threshold energy consumption, operate the telematics unit in a first mode including unrestricted communication. The telematics communication mode controller further includes programming to, when the total energy consumption of the telematics unit through the time period is greater than the first threshold energy consumption and less than the second threshold energy consumption, operate the telematics unit in a second mode including the MICO mode. The telematics communication mode controller further includes programming to, when the total energy consumption of the telematics unit through the time period is greater than the second threshold energy consumption, deactivate communications by the telematics unit.

In some embodiments, the MICO mode includes enabling communications initiated by the telematics unit and disabling communications initiated outside of the vehicle.

In some embodiments, the programming to operate the telematics unit in the second mode including the MICO mode further includes communicating with a local serving cellular network to request permission to enter the MICO mode and, when the local serving cellular network provides the permission to enter the MICO mode, operating the telematics unit in the second mode.

In some embodiments, the programming to operate the telematics unit in the second mode including the MICO mode further includes, when the local serving cellular network does not provide the permission to enter the MICO mode, continuing to operate the telematics unit in the first mode.

In some embodiments, the programming to deactivate the communications by the telematics unit further includes performing a deregistration procedure with the local serving cellular network.

In some embodiments, the programming to deactivate the communications by the telematics unit further includes notifying a user of the vehicle that the vehicle would benefit from charging.

In some embodiments, the programming to deactivate the communications by the telematics unit further includes sending a device location and potentially stranded vehicle alert to a vehicle manufacturer database or to local authorities.

According to one alternative embodiment, a system for enabling fifth generation (5G) mobile initiated communications only (MICO) mode for extended operation of a vehicle is provided. The system includes an energy storage device, a wireless communication system, and a telematics unit configured for communicating with a remote server device through the wireless communication system and drawing electrical energy from the energy storage device. The system further includes a telematics communication mode controller, including programming to monitor initiation of an ignition off mode of the vehicle, monitor energy consumption by the telematics unit over a time period starting with the initiation of the ignition off mode, and monitor energy consumption by the wireless communication system over the time period. The controller further includes programming to estimate a total energy consumption of the telematics unit and the wireless communication system through the time period and compare the total energy consumption of the telematics unit and the wireless communication system through the time period to a first threshold energy consumption and a second threshold energy consumption. The controller further includes programming to, when the total energy consumption of the telematics unit and the wireless communication system through the time period is less than the first threshold energy consumption, operate the telematics unit and the wireless communication system in a first mode including unrestricted communication. The controller further includes programming to, when the total energy consumption of the telematics unit and the wireless communication system through the time period is greater than the first threshold energy consumption and less than the second threshold energy consumption, operate the telematics unit and the wireless communication system in a second mode including the MICO mode. Operating the telematics unit in the second mode is configured for reducing a rate of energy consumption by the telematics unit. The controller further includes programming to, when the total energy consumption of the telematics unit and the wireless communication system through the time period is greater than the second threshold energy consumption, deactivate communications by the telematics unit and the wireless communication system.

In some embodiments, the MICO mode includes enabling communications initiated by the telematics unit and disabling communications initiated outside of the vehicle.

In some embodiments, the programming to operate the telematics unit and the wireless communication system in the second mode including the MICO mode further includes communicating with a local serving cellular network to request permission to enter the MICO mode, when the local serving cellular network provides the permission to enter the MICO mode, operating the telematics unit and the wireless communication system in the second mode.

In some embodiments, the programming to operate the telematics unit and the wireless communication system in the second mode including the MICO mode further includes, when the local serving cellular network does not provide the permission to enter the MICO mode, continuing to operate the telematics unit and the wireless communication system in the first mode.

In some embodiments, the programming to deactivate the communications by the telematics unit and the wireless communication system further includes performing a deregistration procedure with the local serving cellular network.

According to one alternative embodiment, a method for enabling fifth generation (5G) mobile initiated communications only (MICO) mode for extended operation of a vehicle is provided. The method includes operating an energy storage device, operating a wireless communication system, and operating a telematics unit configured for communicating with a remote server device through the wireless communication system and drawing electrical energy from the energy storage device. The method further includes, within a computerized processor, monitoring initiation of an ignition off mode of the vehicle, monitoring energy consumption by the telematics unit over a time period starting with the initiation of the ignition off mode, and estimating a total energy consumption of the telematics unit through the time period. The method further includes comparing the total energy consumption of the telematics unit through the time period to a first threshold energy consumption and a second threshold energy consumption and, when the total energy consumption of the telematics unit through the time period is less than the first threshold energy consumption, operating the telematics unit in a first mode including unrestricted communication. The method further includes, when the total energy consumption of the telematics unit through the time period is greater than the first threshold energy consumption and less than the second threshold energy consumption, operating the telematics unit in a second mode including the MICO mode, wherein operating the telematics unit in the second mode is configured for reducing a rate of energy consumption by the telematics unit. The method further includes, when the total energy consumption of the telematics unit through the time period is greater than the second threshold energy consumption, deactivating communications by the telematics unit.

In some embodiments, operating the telematics unit in the second mode including the MICO mode includes enabling communications initiated by the telematics unit and disabling communications initiated outside of the vehicle.

In some embodiments, operating the telematics unit in the second mode including the MICO mode further includes communicating with a local serving cellular network to request permission to enter the MICO mode, when the local serving cellular network provides the permission to enter the MICO mode, operating the telematics unit in the second mode.

In some embodiments, operating the telematics unit in the second mode including the MICO mode further includes, when the local serving cellular network does not provide the permission to enter the MICO mode, continuing to operate the telematics unit in the first mode.

In some embodiments, deactivating the communications by the telematics unit further includes performing a deregistration procedure with the local serving cellular network.

In some embodiments, deactivating the communications by the telematics unit further includes notifying a user of the vehicle that the vehicle would benefit from charging.

In some embodiments, deactivating the communications by the telematics unit further includes sending a device location and potentially stranded vehicle alert to a vehicle manufacturer database or to local authorities.

The above features and advantages and other features and advantages of the present disclosure are readily apparent from the following detailed description of the best modes for carrying out the disclosure when taken in connection with the accompanying drawings.

DETAILED DESCRIPTION

Figure 1:
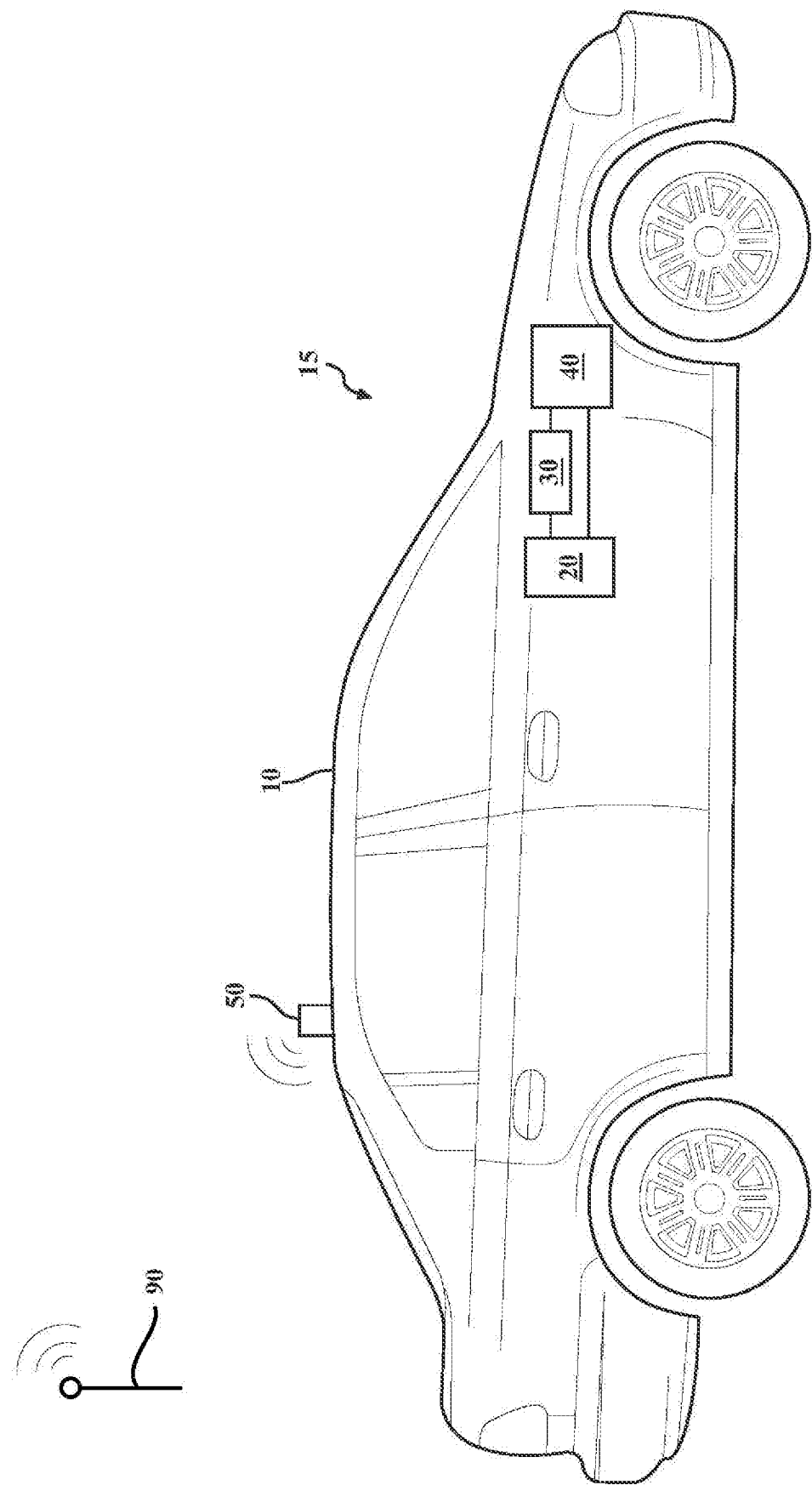
FIG. 1 illustrates an exemplary device embodied as a vehicle including a system including a telematics unit receiving power from an energy storage device, in accordance with the present disclosure.

Battery state of charge while a vehicle is in an ignition off state may be managed or budgeted. In one example, such budgeting may permit various functions within the vehicle to utilize battery state of charge when the battery state of charge during the ignition off period is relatively high. As the battery state of charge decreases or if the initial battery state of charge is relatively low, a number of functions permitted to draw electrical energy from the battery may be restricted or limited, for example, with lower priority functions being restricted or cut off from the battery while higher priority functions may be retained as the battery state of charge decreases.

A system and method for enabling fifth generation (5G) mobile initiated communications only (MICO) mode for extended vehicle operations is provided. The system and method enable extending a period of time a vehicle in ignition off state is able to initiate communications with a telematics server. The means for extending the duration is enabled by initiating procedures within the vehicle telematics unit to transition from the default mode of operation in which a communications session may be initiated by the either the vehicle or by a remote server to a mode of operation defined for 5G stand-alone (SA) devices and networks called MICO. In this mode of operation, the vehicle telematics unit is not utilized to monitor cellular paging nor initiate periodic updates with the serving cellular network. As such, less energy per unit of time is consumed by the vehicle telematics unit allowing it to extend its period of being capable of initiating communications with a remote server.

The disclosed system and method may determine that consumption of electrical energy during an ignition off state by the telematics unit exceeds a pre-defined threshold. The system and method may subsequently initiate 5G SA signaling procedures with the serving cellular network to invoke or operate a MICO mode of operation. This mode enables the vehicle telematics unit to forego monitoring cellular network paging and also eliminates the need for the telematics unit to perform periodic registration updates with the serving cellular network resulting in a savings of energy consumed per unit of time.

In one embodiment, the disclosed method may include, within a vehicle, upon initiation of an ignition off mode, tracking or summing a total amount of energy consumed by the telematics unit since the start of the ignition off mode. When the total amount of energy consumed by the telematics unit is below a first threshold energy consumption, the method includes operating a first mode including unrestricted operation of a 5G telematics communications system. When the telematics unit is determined to have consumed at least a first threshold energy consumption amount of total energy since the vehicle entered the ignition off mode, the method may operate a second mode including operating a MICO mode of operation for the 5G telematics communication system. The method may further include, when the telematics unit is determined to have consumed at least a second threshold energy consumption amount of total energy since the vehicle entered the ignition off mode, ceasing operation of the 5G telematics communication system.

In another embodiment, the disclosed method may include, within a vehicle, upon initiation of an ignition off mode, tracking or summing a total amount of energy consumed by the devices of the vehicle drawing electrical energy from the battery since the start of the ignition off mode. When the total amount of energy consumed by the devices drawing electrical energy from the battery is below a first threshold energy consumption, the method includes operating a first mode including unrestricted operation of a 5G telematics communications system. The method may further include, when the devices drawing electrical energy from the battery are determined to have consumed at least a first threshold energy consumption amount of total energy since the vehicle entered the ignition off mode, operating a second mode including operating a MICO mode of operation for the 5G telematics communication system. The method may further include, when the devices drawing electrical energy from the battery determined to have consumed at least a second threshold energy consumption amount of total energy since the vehicle entered the ignition off mode, ceasing operation of the 5G telematics communication system.

In another embodiment, the disclosed method may include, within a vehicle, upon initiation of an ignition off mode, when a battery state of charge is above a first threshold energy consumption, operating a first mode including unrestricted operation of a 5G telematics communications system. The method may further include, when the battery state of charge is equal to or below the first threshold energy consumption and above a second, shut-down threshold, operating a second mode including operating a MICO mode of operation for the 5G telematics communication system. The method may further include, when the battery state of charge is equal to or less than the second, shut-down threshold, ceasing operation of the 5G telematics communication system.

In another embodiment, the disclosed method may include, within a vehicle, upon initiation of an ignition off mode, when a battery open cell voltage is above a first threshold energy consumption, operating a first mode including unrestricted operation of a 5G telematics communications system. The method may further include, when the battery open cell voltage is equal to or below the first threshold energy consumption and above a second, shut-down threshold, operating a second mode including operating a MICO mode of operation for the 5G telematics communication system. The method may further include, when the battery open cell voltage is equal to or less than the second, shut-down threshold, ceasing operation of the 5G telematics communication system.

In yet another embodiment, the disclosed method may include, within a vehicle, upon initiation of an ignition off mode, for a first defined time period, operating a first mode including unrestricted operation of a 5G telematics communications system. The method may further include, after expiration of the first defined time period and within a second defined time period, operating a second mode including operating a MICO mode of operation for the 5G telematics communication system. The method may further include, after the expiration of the second time period, shut-down threshold, ceasing operation of the 5G telematics communication system.

A battery electric vehicle including a battery pack may utilize the disclosed system and method. During an ignition off state, a battery electric vehicle may sit idle or the battery electric vehicle may be connected to an external energy source useful to charge the battery pack. The disclosed system and method are useful to budget energy consumption by a telematics unit of the battery electric vehicle when the vehicle is in an ignition off state and is not being charged. If the battery electric vehicle is currently connected to an energy source useful to charge the battery, the telematics unit may operate normally without depleting the battery of the vehicle.

Referring now to the drawings, wherein like reference numbers refer to like features throughout the several views, FIG. 1 illustrates an exemplary device 10 embodied as a vehicle including a system 15 including a telematics unit 20 receiving power from an energy storage device 40. The device 10 may include a vehicle powered with a combustion engine, a battery electric vehicle including an electric machine providing an output torque, or a hybrid vehicle including both a combustion engine and an electric machine providing an output torque. The device 10 is further illustrated including a computerized telematics communication mode controller 30 and a wireless communications system 50. A local serving cellular network 90 is illustrated in wireless communication with the wireless communications system 50. In one embodiment, the telematics unit 20 and the wireless communications system 50 may be described as a 5G telematics communications system. The telematics unit 20 may include a computerized device including a processing device and programming configured to communicate with a remote server device and/or access information from the Internet through the wireless communications system 50.

The telematics communication mode controller 30 is another computerized device including a processing device and programming configured to monitor energy consumed by the telematics unit 20 during an ignition off state. The telematics communication mode controller 30 further includes programming to manage a communications mode of the telematics unit 20 during the ignition off state according to the method disclosed herein. In one embodiment, the disclosed method operated by the telematics communication mode controller 30 may include, within the device 10, upon initiation of an ignition off mode, tracking or summing a total amount of energy consumed by the telematics unit 20 since the start of the ignition off mode. When the total amount of energy consumed by the telematics unit 20 is below a first threshold energy consumption, the method includes operating a first mode including unrestricted operation of the telematics unit 20 and the wireless communications system 50. When the telematics unit 20 is determined to have consumed at least a first threshold energy consumption amount of total energy since the device 10 entered the ignition off mode, the method includes operating a second mode including operating a MICO mode of operation for the telematics unit 20. The method may further include, when the telematics unit 20 is determined to have consumed at least a second threshold energy consumption amount of total energy since the device 10 entered the ignition off mode, ceasing operation of the telematics system 20. The energy storage device 40 may include a battery pack.

In another embodiment, the disclosed method operated by the telematics communication mode controller 30 may include, within the device 10, upon initiation of an ignition off mode, tracking or summing a total amount of energy consumed by the electronic devices of the device 10 drawing electrical energy from the energy storage device 40 since the start of the ignition off mode. Electronic devices of the device 10 may include but are not limited to a device configured to monitor an unlock command and a lock command for the doors of device 10, an audio system for the device 10, and/or a vehicle security system. Electronic devices of the device 10 may include the wireless communications system 50 and the telematics communication mode controller 30. When the total amount of energy consumed by the electronic devices drawing electrical energy from the energy storage device 40 is below a first threshold energy consumption, the method includes operating a first mode including unrestricted operation of the telematics unit 20. When the devices drawing electrical energy from the energy storage device 40 are determined to have consumed at least a first threshold energy consumption amount of total energy since the device 10 entered the ignition off mode, the method includes operating a second mode including operating a MICO mode of operation for the telematics unit 20. The method may further include, when the devices drawing electrical energy from the energy storage device 40 are determined to have consumed at least a first threshold energy consumption amount of total energy since the device 10 entered the ignition off mode, ceasing operation of the telematics unit 20.

Figure 2:
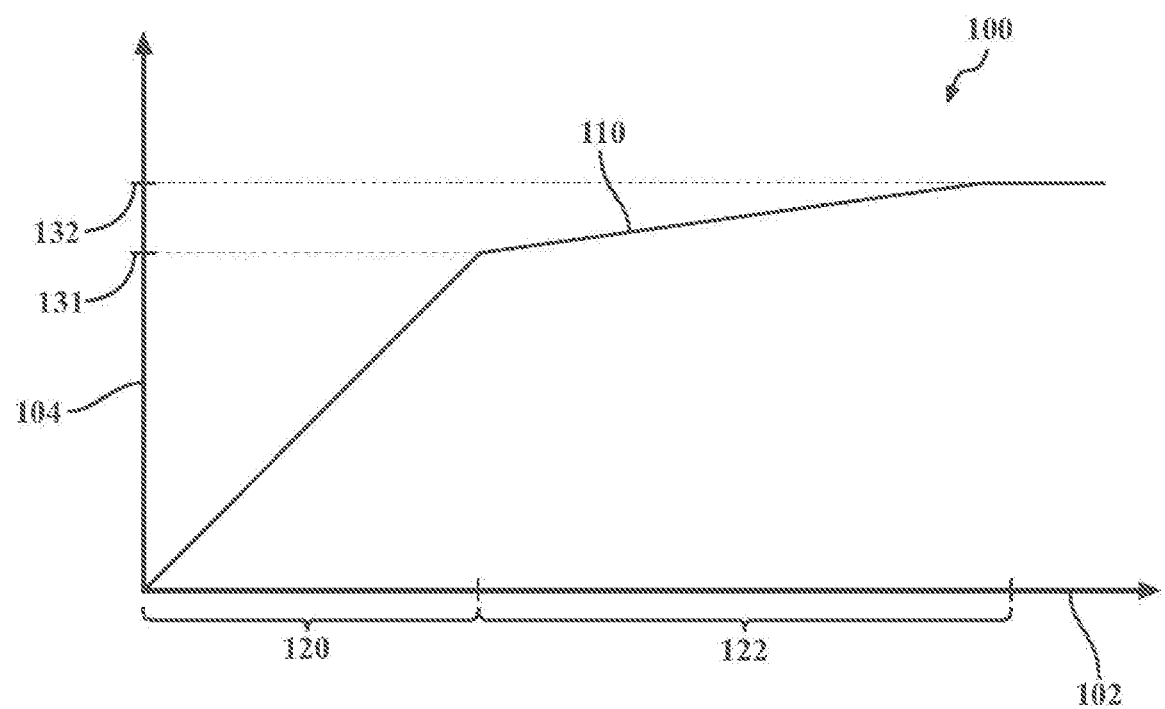
FIG. 2 is a graph illustrating energy consumed by the telematics unit of FIG. 1 over a time period and operation of the modes of the disclosed method, in accordance with the present disclosure.

FIG. 2 is a graph 100 illustrating energy consumed by the telematics unit 20 of FIG. 1 over a time period and operation of the modes of the disclosed method. The graph 100 includes a horizontal axis 102 illustrating time, with a left most side of horizontal axis 102 illustrating a time at which an ignition off mode in the device 10 of FIG. 1 is initiated. The graph 100 further includes a vertical axis 104 illustrating total energy consumed by the telematics unit 20 by a given time. The total energy consumed by the telematics unit 20 by a given time is cumulative, meaning that a point upon plot 110 at some time value describes a total amount of energy consumed by the telematics unit 20 between the initial time and the given time. Calculation of the total amount of energy consumed may be calculated or determined in a number of ways, for example, by integrating an instant energy consumption rate function. Two threshold total energy consumption values 131 and 132 are defined on the vertical axis 104. The first threshold energy consumption total energy consumption value 131 represents a consumption value below which the telematics unit 20 may operate in a first mode in an unrestricted manner, communicating freely through the wireless communication system 50. Time period 120 is illustrated during which the telematics unit 20 operates in the first mode. An assumption or conclusion may be drawn during the time period 120 that the energy storage device 40 still has enough state of charge stored to enable free use of the telematics unit 20.

The second threshold energy consumption total energy consumption value 132 represents a consumption value below which the telematics unit 20 may continue to operate in a second mode including operating a MICO mode of operation, wherein energy consumption is reduced by limiting communication of the telematics unit 20 in order to conserve state of charge within the energy storage device 40. Time period 122 is illustrated during which the telematics unit 20 operates in the second mode. The slope of the plot 110 within the time period 122 is significantly smaller than the slope of the plot 110 within the time period 120, reflecting a slower rate of consumption of energy in the time period 122 as compared to the rate of consumption of energy in the time period 120. An assumption or conclusion may be drawn during the time period 122 that the energy storage device 40 has a reduced yet still functional state of charge stored to enable limited use of the telematics unit 20. At a time value to a right of the time period 122, the total energy consumption of the telematics unit 20 has met or exceeded the second threshold energy consumption 132. In order to retain or protect an ability of the device 10 to meet certain important functions, such as being able to start an engine or travel a threshold distance, the telematics unit 20 may enter a third mode of operation where communication is disabled and the telematics unit 20 is powered down. Upon activation of the third mode of operation, the telematics unit 20 may include programming to send a deactivation notice to a remote server device, for example, initiating an indication to a user that the device 10 would benefit from charging or sending a device location and potentially stranded vehicle alert to a vehicle manufacturer database or to local authorities.

FIG. 2 illustrates data related to a method including monitoring a total energy consumed by the telematics unit 20 of FIG. 1. It will be appreciated that a similar method may be operated including monitoring a total energy consumed by the telematics unit 20 and the wireless communications system 50 or including monitoring a total energy consumed by the electronic devices of device 10 drawing electrical energy from the energy storage device 40 of FIG. 1.

Figure 3:
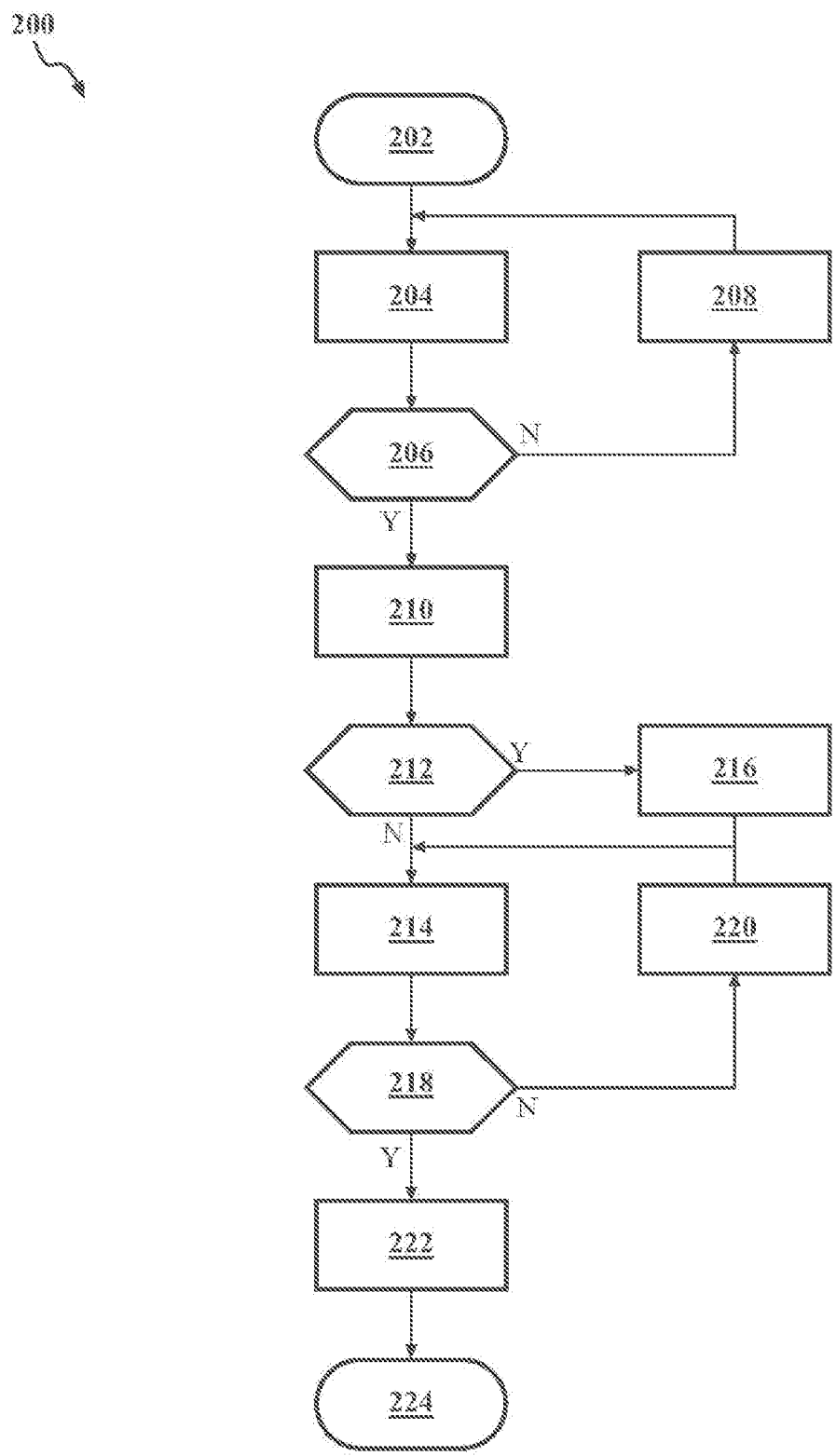
FIG. 3 is a flowchart illustrating a method for enabling fifth generation (5G) mobile initiated communications only (MICO) mode for extended vehicle operations, in accordance with the present disclosure.

FIG. 3 is a flowchart illustrating a method 200 for enabling fifth generation (5G) mobile initiated communications only (MICO) mode for extended vehicle operations. The method 200 starts at step 202 wherein a vehicle enters an ignition off mode. At step 204, a total consumed energy value is estimated or determined describing a total consumed energy by the telematics unit 20 of FIG. 1. At step 206, a determination is made whether the total consumed energy value exceeds a first threshold energy consumption. If the total consumed energy value does not exceed the first threshold energy consumption, the method 200 advances to step 208 where the telematics unit 20 is permitted to operate in a first mode including unrestricted operation. If the total consumed energy value does exceed the first threshold energy consumption, the method 200 advances to step 210, where the vehicle performs a mobility registration update procedure including a request for operation in a second mode including MICO mode operation. The mobility registration update procedure including the request to operate in the MICO mode may be an optional step, depending upon capabilities and permissions of a local serving cellular network. At step 212, a determination is made whether the local serving cellular network grants permission for the vehicle to operate in the MICO mode. If permission in step 212 is given, the method 200 advances to step 216, wherein operation of the telematics unit 20 in MICO mode is initiated and the method 200 subsequently advances to step 214. If permission in step 212 is not given, the method 200 advances to the step 214. At the step 214, the total consumed energy value is estimated or determined. At step 218, a determination is made whether the total consumed energy value exceeds a second threshold energy consumption. If the total consumed energy value does not exceed the second threshold energy consumption, the method advances to step 220, where the telematics unit 20 may continue to operate in a current mode of operation, and the method 200 subsequently returns to the step 214 to continue to monitor the total consumed energy value. If the total consumed energy value does exceed the second threshold energy consumption, the method 200 advances to step 222, where the system 15 of FIG. 1 performs a deregistration procedure with the local serving cellular network and a "switch off" indication is provided. The method 200 ends at step 224.

In an alternative embodiment of method 200, steps 204 and 214 estimating a total consumed energy value by the telematics unit 20 of FIG. 1 may alternatively estimate a total consumed energy value of the telematics unit 20 and the wireless communications system 50 of FIG. 1 acting together as a 5G telematics communications system. This combined total consumed energy value of the 5G telematics communications system may be compared with each of two threshold values, and the operation of both of the telematics unit 20 and the wireless communications system 50 may be limited or deactivated based upon the comparisons.

The method 200 is provided as an exemplary method for enabling fifth generation (5G) mobile initiated communications only (MICO) mode for extended vehicle operations. The steps provided are exemplary, the disclosure is not intended to be limited to the exemplary steps, and the method 200 may include one or more additional or alternative steps.

Figure 4:
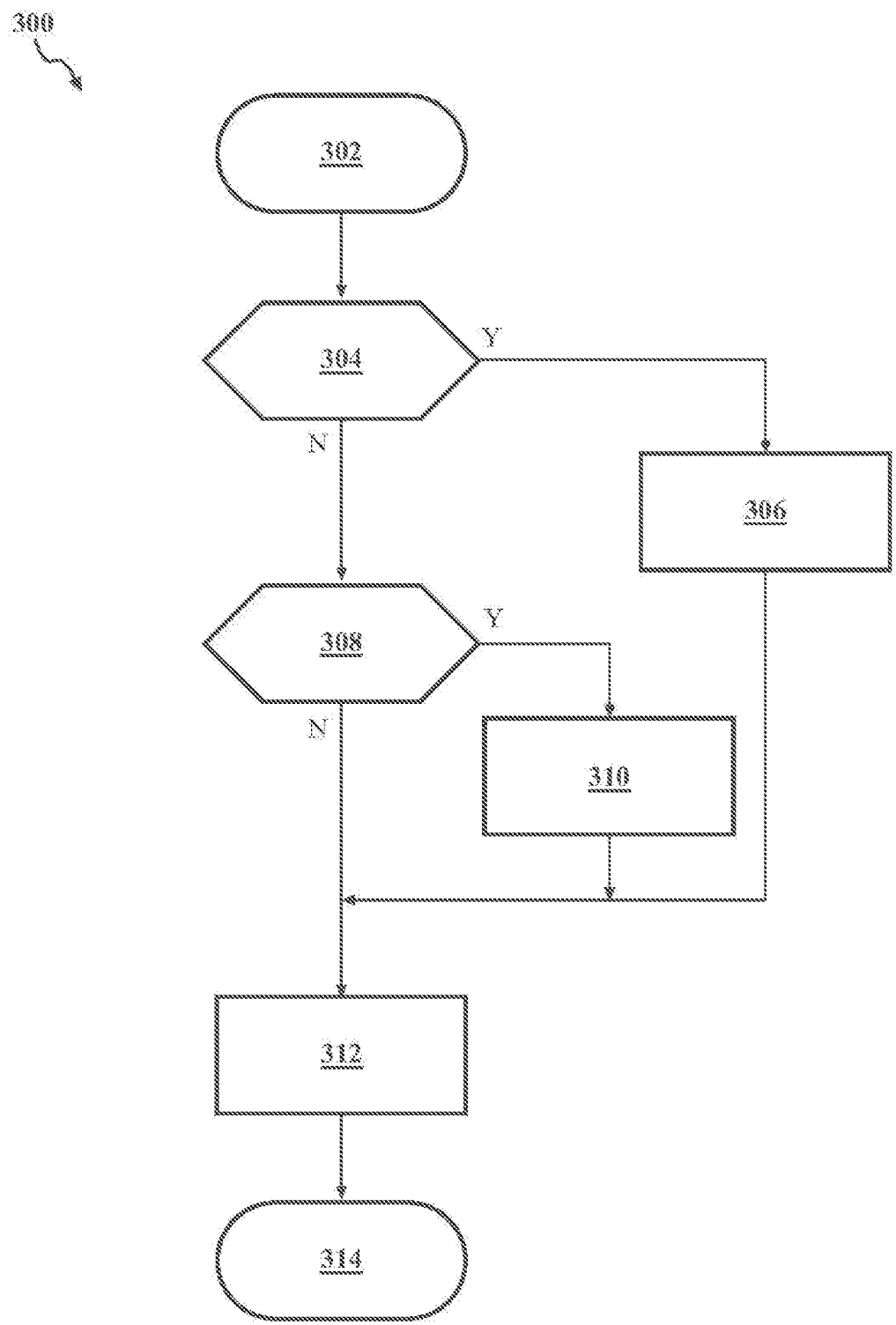
FIG. 4 is a flowchart illustrating a method for resuming unrestricted operation of the telematics unit of FIG. 1 after operation of the method of FIG. 3, in accordance with the present disclosure.

FIG. 4 is a flowchart illustrating a method 300 for resuming unrestricted operation of the telematics unit 20 of FIG. 1 after operation of the method 200 of FIG. 3. The method 300 starts at step 302 wherein a vehicle, having previously operated method 200 of FIG. 3, enters an ignition on mode. At step 304, a determination is made whether the system 15 of FIG. 1 performed a deregistration procedure with the local serving cellular network. If the deregistration procedure was performed, the method 300 advances to step 306, where an initial registration procedure with a local serving cellular network is performed, and the method 300 subsequently advances to step 312. If the deregistration procedure was not performed, the method 300 advances to step 308, wherein a determination is made whether the telematics unit 20 is operating in the MICO operating mode. If the telematics unit 20 is operating in the MICO operating mode, the method 300 advances to step 310, wherein an initial registration procedure with a local serving cellular network is performed, and the method 300 subsequently advances to step 312. At step 312, the telematics unit 20 operates in an unrestricted mode of operation. At step 314, the method 300 ends. The method 300 is provided as an exemplary method for resuming unrestricted operation of the telematics unit 20 after operation of the method 200. The steps provided are exemplary, the disclosure is not intended to be limited to the exemplary steps, and the method 300 may include one or more additional or alternative steps.

Figure 5:
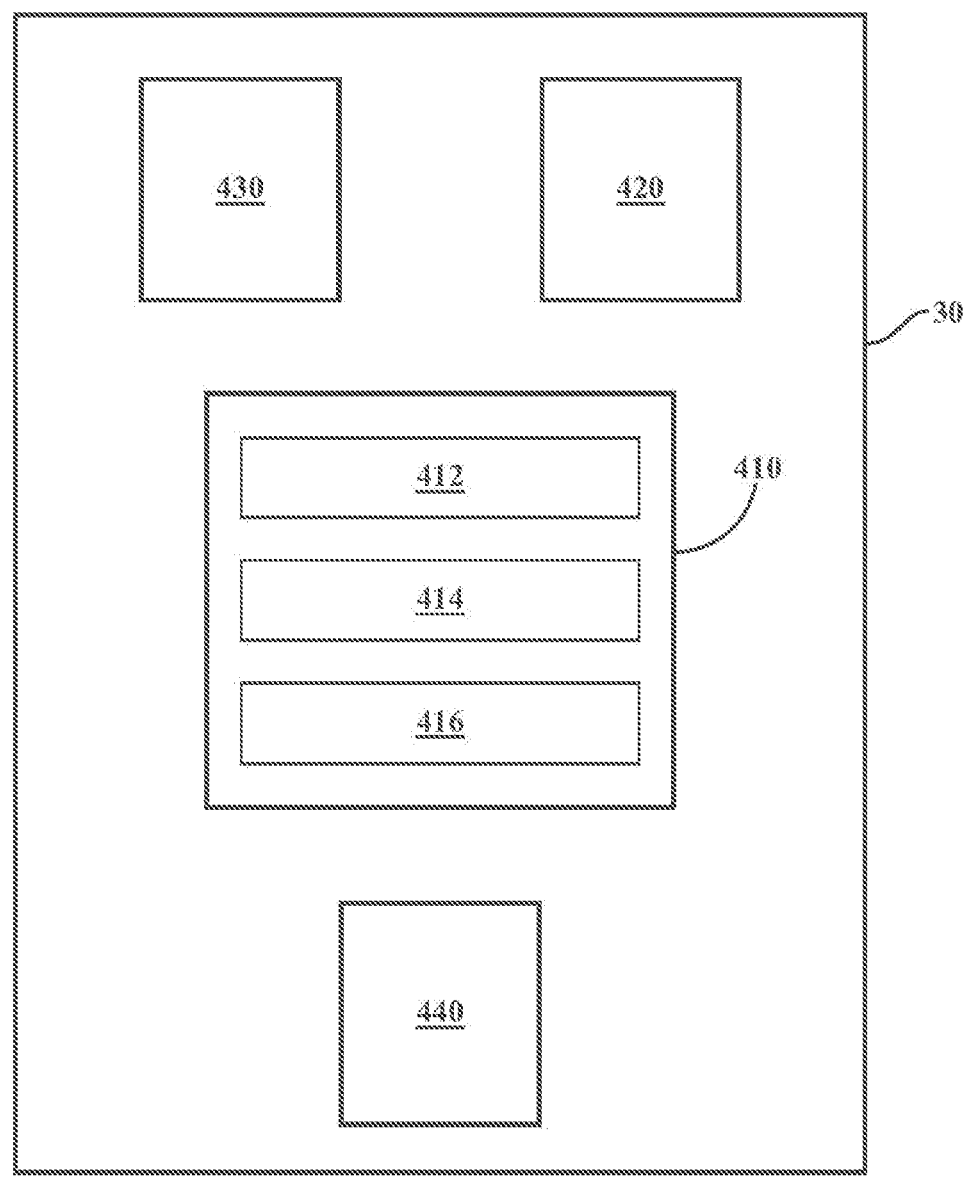
FIG. 5 schematically illustrates the computerized telematics communication mode controller of FIG. 1, in accordance with the present disclosure.

FIG. 5 schematically illustrates the computerized telematics communication mode controller 30 of FIG. 1. The computerized telematics communication mode controller 30 includes a computerized processing device 410, a communications device 420, an input output coordination device 430, and a memory storage device 440. It is noted that the computerized telematics communication mode controller 30 may include other components and some of the components are not present in some embodiments.

The processing device 410 may include memory, e.g., read only memory (ROM) and random-access memory (RAM), storing processor-executable instructions and one or more processors that execute the processor-executable instructions. In embodiments where the processing device 410 includes two or more processors, the processors may operate in a parallel or distributed manner. The processing device 410 may execute the operating system of the telematics communication mode controller 30. Processing device 410 may include one or more modules executing programmed code or computerized processes or methods including executable steps. Illustrated modules may include a single physical device or functionality spanning multiple physical devices. In the illustrative embodiment, the processing device 410 also includes a total energy consumption estimation module 412, a threshold comparison module 414, and a MICO mode and deactivation module 416, which are described in greater detail below.

The communications device 420 may include a communications/data connection with a bus device configured to transfer data to different components of the system and may include one or more wireless transceivers for performing wireless communication.

The input output coordination device 430 includes hardware and/or software configured to enable the processing device 410 to receive and/or exchange data with on-board sensors of the host vehicle and to provide control of switches, modules, and processes throughout the vehicle based upon determinations made within the processing device 410.

The memory storage device 440 is a device that stores data generated or received by the telematics communication mode controller 30. The memory storage device 440 may include, but is not limited to, a hard disc drive, an optical disc drive, and/or a flash memory drive.

The total energy consumption estimation module 412 may include programming to monitor and accumulate data related to total energy consumption during an ignition off mode. For example, the total energy consumption estimation module 412 may monitor a voltage and current draw of the telematics unit 20 of FIG. 1, and based upon these values, the total energy consumption estimation module 412 may estimate the total energy consumption of the telematics unit 20 through a time period.

The threshold comparison module 414 may include programming to compare the total energy consumption estimated or determined by the total energy consumption estimation module 412 to one or more threshold values, for example, the threshold values of method 200 of FIG. 3. The threshold values may be static, fixed values. In another embodiment, the threshold values may be dynamic, for example, based upon an average state of charge used to start an engine of the vehicle at a particular ambient temperature or a minimum state of charge for a battery electric vehicle to reach a programmed destination or a nearest charging station.

The MICO mode and deactivation module 416 may include programming to provide commands or electronic instructions to the system 15 of FIG. 1, including programming to limit communications performed by the telematics unit 20 or deactivate communications by the telematics unit 20. The MICO mode and deactivation module 416 may further include programming to register, deregister, and seek permission to enter a MICO operating mode with a local serving cellular network.

The computerized telematics communication mode controller 30 is provided as an exemplary computerized device capable of executing programmed code to operate the disclosed method. A number of different embodiments of the telematics communication mode controller 30 and modules operable therein are envisioned, and the disclosure is not intended to be limited to examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A system for enabling fifth generation (5G) mobile initiated communications only (MICO) mode for extended operation of a vehicle, the system comprising:
   an energy storage device;
   a wireless communication system;
   a telematics unit configured for communicating with a remote server device through the wireless communication system and drawing electrical energy from the energy storage device; and
   a telematics communication mode controller, including programming to:
      monitor initiation of an ignition off mode of the vehicle;
      monitor energy consumption by the telematics unit over a time period starting with the initiation of the ignition off mode;
      estimate a total energy consumption of the telematics unit through the time period;
      compare the total energy consumption of the telematics unit through the time period to a first threshold energy consumption and a second threshold energy consumption;
      when the total energy consumption of the telematics unit through the time period is less than the first threshold energy consumption, operate the telematics unit in a first mode including unrestricted communication;
      when the total energy consumption of the telematics unit through the time period is greater than the first threshold energy consumption and less than the second threshold energy consumption, operate the telematics unit in a second mode including the MICO mode, wherein operating the telematics unit in the second mode is configured for reducing a rate of energy consumption by the telematics unit; and
      when the total energy consumption of the telematics unit through the time period is greater than the second threshold energy consumption, deactivate communications by the telematics unit.

2. The system of claim 1, wherein the MICO mode includes enabling communications initiated by the telematics unit and disabling communications initiated outside of the vehicle.

3. The system of claim 1, wherein the programming to operate the telematics unit in the second mode including the MICO mode further includes:
   communicating with a local serving cellular network to request permission to enter the MICO mode; and
   when the local serving cellular network provides the permission to enter the MICO mode, operating the telematics unit in the second mode.

4. The system of claim 3, wherein the programming to operate the telematics unit in the second mode including the MICO mode further includes when the local serving cellular network does not provide the permission to enter the MICO mode, continuing to operate the telematics unit in the first mode.

5. The system of claim 1, wherein the programming to deactivate the communications by the telematics unit further includes performing a deregistration procedure with a local serving cellular network.

6. The system of claim 1, wherein the programming to deactivate the communications by the telematics unit further includes notifying a user of the vehicle that the vehicle would benefit from charging.

7. The system of claim 1, wherein the programming to deactivate the communications by the telematics unit further includes sending a device location and potentially stranded vehicle alert to a vehicle manufacturer database or to local authorities.

8. A system for enabling fifth generation (5G) mobile initiated communications only (MICO) mode for extended operation of a vehicle, the system comprising:
   an energy storage device;
   a wireless communication system;
   a telematics unit configured for communicating with a remote server device through the wireless communication system and drawing electrical energy from the energy storage device; and
   a telematics communication mode controller, including programming to:
      monitor initiation of an ignition off mode of the vehicle;
      monitor energy consumption by the telematics unit over a time period starting with the initiation of the ignition off mode;
      monitor energy consumption by the wireless communication system over the time period;
      estimate a total energy consumption of the telematics unit and the wireless communication system through the time period;
      compare the total energy consumption of the telematics unit and the wireless communication system through the time period to a first threshold energy consumption and a second threshold energy consumption;
      when the total energy consumption of the telematics unit and the wireless communication system through the time period is less than the first threshold energy consumption, operate the telematics unit and the wireless communication system in a first mode including unrestricted communication;

when the total energy consumption of the telematics unit and the wireless communication system through the time period is greater than the first threshold energy consumption and less than the second threshold energy consumption, operate the telematics unit and the wireless communication system in a second mode including the MICO mode, wherein operating the telematics unit in the second mode is configured for reducing a rate of energy consumption by the telematics unit; and when the total energy consumption of the telematics unit and the wireless communication system through the time period is greater than the second threshold energy consumption, deactivate communications by the telematics unit and the wireless communication system.

9. The system of claim 8, wherein the MICO mode includes enabling communications initiated by the telematics unit and disabling communications initiated outside of the vehicle.

10. The system of claim 8, wherein the programming to operate the telematics unit and the wireless communication system in the second mode including the MICO mode further includes:

communicating with a local serving cellular network to request permission to enter the MICO mode; and when the local serving cellular network provides the permission to enter the MICO mode, operating the telematics unit and the wireless communication system in the second mode.

11. The system of claim 10, wherein the programming to operate the telematics unit and the wireless communication system in the second mode including the MICO mode further includes:

when the local serving cellular network does not provide the permission to enter the MICO mode, continuing to operate the telematics unit and the wireless communication system in the first mode.

12. The system of claim 8, wherein the programming to deactivate the communications by the telematics unit and the wireless communication system further includes performing a deregistration procedure with a local serving cellular network.

13. A method for enabling fifth generation (5G) mobile initiated communications only (MICO) mode for extended operation of a vehicle, the method comprising:

operating an energy storage device;

operating a wireless communication system;

operating a telematics unit configured for communicating with a remote server device through the wireless communication system and drawing electrical energy from the energy storage device; and within a computerized processor:

monitoring initiation of an ignition off mode of the vehicle;

monitoring energy consumption by the telematics unit over a time period starting with the initiation of the ignition off mode;

estimating a total energy consumption of the telematics unit through the time period;

comparing the total energy consumption of the telematics unit through the time period to a first threshold energy consumption and a second threshold energy consumption;

when the total energy consumption of the telematics unit through the time period is less than the first threshold energy consumption, operating the telematics unit in a first mode including unrestricted communication;

when the total energy consumption of the telematics unit through the time period is greater than the first threshold energy consumption and less than the second threshold energy consumption, operating the telematics unit in a second mode including the MICO mode, wherein operating the telematics unit in the second mode is configured for reducing a rate of energy consumption by the telematics unit; and when the total energy consumption of the telematics unit through the time period is greater than the second threshold energy consumption, deactivating communications by the telematics unit.

14. The method of claim 13, wherein operating the telematics unit in the second mode including the MICO mode includes enabling communications initiated by the telematics unit and disabling communications initiated outside of the vehicle.

15. The method of claim 13, wherein operating the telematics unit in the second mode including the MICO mode further includes:

communicating with a local serving cellular network to request permission to enter the MICO mode; and when the local serving cellular network provides the permission to enter the MICO mode, operating the telematics unit in the second mode.

16. The method of claim 15, wherein operating the telematics unit in the second mode including the MICO mode further includes when the local serving cellular network does not provide the permission to enter the MICO mode, continuing to operate the telematics unit in the first mode.

17. The method of claim 13, wherein deactivating the communications by the telematics unit further includes performing a deregistration procedure with a local serving cellular network.

18. The method of claim 13, wherein deactivating the communications by the telematics unit further includes notifying a user of the vehicle that the vehicle would benefit from charging.

19. The method of claim 13, wherein deactivating the communications by the telematics unit further includes sending a device location and potentially stranded vehicle alert to a vehicle manufacturer database or to local authorities.

* * * * *